(12) United States Patent
Murakami et al.

(10) Patent No.: US 7,679,608 B2
(45) Date of Patent: Mar. 16, 2010

(54) TOUCH PANEL

(75) Inventors: Tetsuo Murakami, Osaka (JP); Nobuhiro Yamaue, Fukui (JP); Akira Nakanishi, Osaka (JP); Hirofumi Komiya, Osaka (JP); Yoshiharu Abe, Osaka (JP)

(73) Assignee: Panasonic Corporation, Osaka (JP)

( * ) Notice: Subject to any disclaimer, the term of this patent is extended or adjusted under 35 U.S.C. 154(b) by 1067 days.

(21) Appl. No.: 11/294,286

(22) Filed: Dec. 5, 2005

(65) Prior Publication Data

US 2006/0132466 A1 Jun. 22, 2006

(30) Foreign Application Priority Data

Dec. 20, 2004 (JP) ............................. 2004-367166

(51) Int. Cl.
*G06F 3/041* (2006.01)
(52) U.S. Cl. ....................... 345/173; 345/176
(58) Field of Classification Search ........................ None
See application file for complete search history.

(56) References Cited

U.S. PATENT DOCUMENTS

| | | | |
|---|---|---|---|
| 6,555,235 B1 * | 4/2003 | Aufderheide et al. | 428/447 |
| 2003/0214619 A1 | 11/2003 | Masuda et al. | |
| 2006/0007172 A1 * | 1/2006 | Baker et al. | 345/173 |

FOREIGN PATENT DOCUMENTS

| | | |
|---|---|---|
| JP | 07-036623 | 2/1995 |
| JP | 2003-140817 A | 5/2003 |
| JP | 2003-280821 A | 10/2003 |

* cited by examiner

*Primary Examiner*—Alexander Eisen
*Assistant Examiner*—Robin Mishler
(74) *Attorney, Agent, or Firm*—RatnerPrestia

(57) ABSTRACT

The touch panel has a light-transmissive upper substrate, a light-transmissive lower substrate, and a bonding layer. The lower surface of the upper substrate is formed thereon with an upper conductive layer. The top surface of the lower substrate is formed thereon with a lower conductive layer facing the upper conductive layer with an air gap. The bonding layer is formed on at least one of inner edges of the lower surface of the upper substrate and the top surface of the lower substrate, and additionally has an open groove communicating with the air gap. The makeup provides a touch panel reliably operable with a simple structure.

5 Claims, 2 Drawing Sheets

TOUCH PANEL

BACKGROUND OF THE INVENTION

1. Field of the Invention

The present invention relates to a touch panel used for operating various types of electronic devices.

2. Background Art

In recent years, various types of electronic devices such as a mobile phone and car navigation system have been increasingly equipped with a light-transmissive touch panel on the front surface of their display element such as a liquid crystal screen. The user of a device views and selects characters, symbols, and the like, which displayed on the display element is provided on the back surface of this touch panel through this touch panel. The user further selects each function of the device by pressing the touch panel with a finger, dedicated pen, or the like. Such a touch panel is demanded that provides reliable operation at low cost.

A description will be made for the conventional touch panel, using FIGS. 3 and 4.

FIG. 3 is a plan view of the conventional touch panel. FIG. 4 is a sectional view taken along line 4-4, of the touch panel shown in FIG. 3. In FIGS. 3 and 4, upper substrate 51 is film-like and light-transmissive. Lower substrate 52 is light-transmissive. The lower surface of upper substrate 51 is formed thereon with upper conductive layer 53 which is light-transmissive with a material such as indium tin oxide. The top surface of lower substrate 52 is also formed thereon with lower conductive layer 54 which is light-transmissive and is made with a material such as indium tin oxide.

The top surface of lower conductive layer 54 is formed thereon with a plurality of dot-shaped spacers (not illustrated) made from insulating resin, at given intervals. Both ends of upper conductive layer 53 are further formed thereon with a pair of upper electrodes (not illustrated). Both ends of lower conductive layer 54 are formed thereon with a pair of lower electrodes (not illustrated) orthogonally to the upper electrode.

Further, upper insulating layer 55 is formed on the inner edge of the lower surface of upper substrate 51 in a frame-like form. Lower insulating layer 56 is formed on the inner edge of the top surface of lower substrate 52 in a frame-like form. Upper bonding layer 57 is formed on the lower surface of upper insulating layer 55 in a frame-like form. Lower bonding layer 58 is formed on the top surface of lower insulating layer 56 in a frame-like form.

Wiring board 59 is further formed with a plurality of wiring patterns (not illustrated) on its top and lower surfaces, with upper and lower electrodes connected to the patterns. The respective outer parts of upper substrate 51 and lower substrate 52 are bonded each other by means of upper bonding layer 57 and lower bonding layer 58. Upper conductive layer 53 and lower conductive layer 54 are facing each other with certain air gap 60 provided to compose touch panel 50.

Touch panel 50 composed in this way is arranged on the front surface of a liquid crystal display element (not illustrated) or the like, to be attached to an electronic device. A pair of upper electrodes and a pair of lower electrodes are respectively connected to the electronic circuit (not illustrated) of the device through wiring board 59.

In the above-mentioned makeup, the top surface of upper substrate 51 is pressed by a finger, pen, or the like, while the display of the liquid crystal display element or the like on the back surface of touch panel 50 is viewed through touch panel 50. Consequently, upper substrate 51 deforms, causing upper conductive layer 53 corresponding to a position having been pressed to contact with lower conductive layer 54.

Then a voltage is applied sequentially to the upper and lower electrodes through wiring board 59 from the electronic circuit. The electronic circuit detects a position having been pressed owing to the voltage ratio between these electrodes, enabling various functions of the device to be selected.

Such a touch panel 50 is disclosed in Japanese Patent Unexamined Publication No. 2003-280821, for example.

SUMMARY OF THE INVENTION

A touch panel according to the present invention has a light-transmissive upper substrate, a light-transmissive lower substrate, and a bonding layer. The lower surface of the upper substrate is formed thereon with an upper conductive layer, and the top surface of the lower substrate is formed thereon with a lower conductive layer facing the upper conductive layer with an air gap. The bonding layer is formed on at least one of inner edges of the lower surface of the upper substrate and the top surface of the lower substrate, and additionally has an open groove communicating with the air gap. The makeup provides a touch panel reliably operable with a simple structure.

DETAILED DESCRIPTION OF THE INVENTION

Hereinafter, a description will be made for an embodiment of the present invention, using FIGS. 1 and 2.

EMBODIMENT

Figure 1:
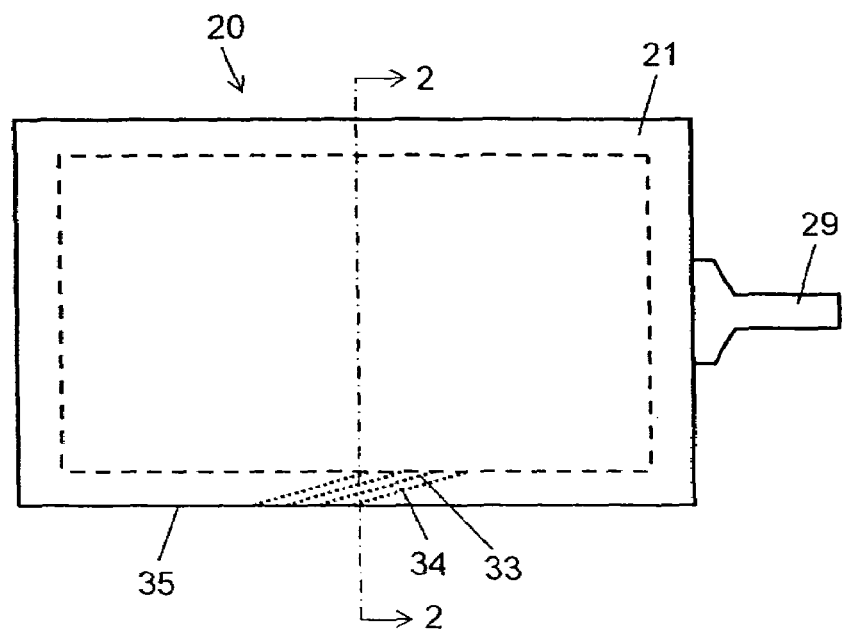
FIG. 1 is a plan view of a touch panel according to an embodiment of the present invention.
Figure 2:
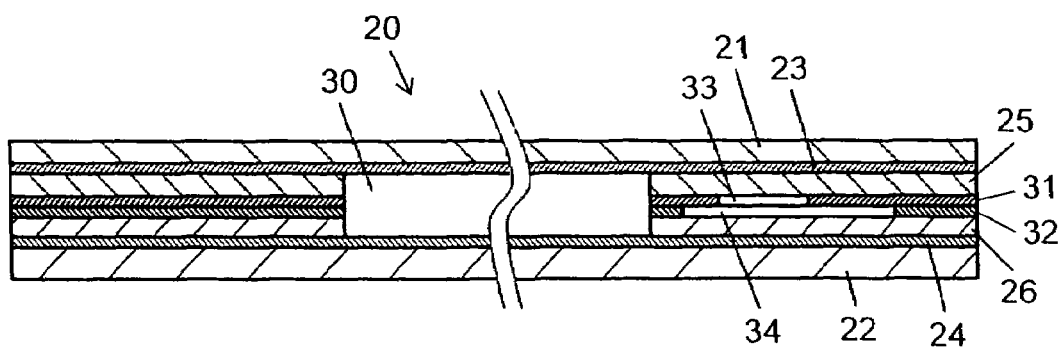
FIG. 2 is a sectional view taken along line 2-2, of the touch panel shown in FIG. 1.
Figure 3:
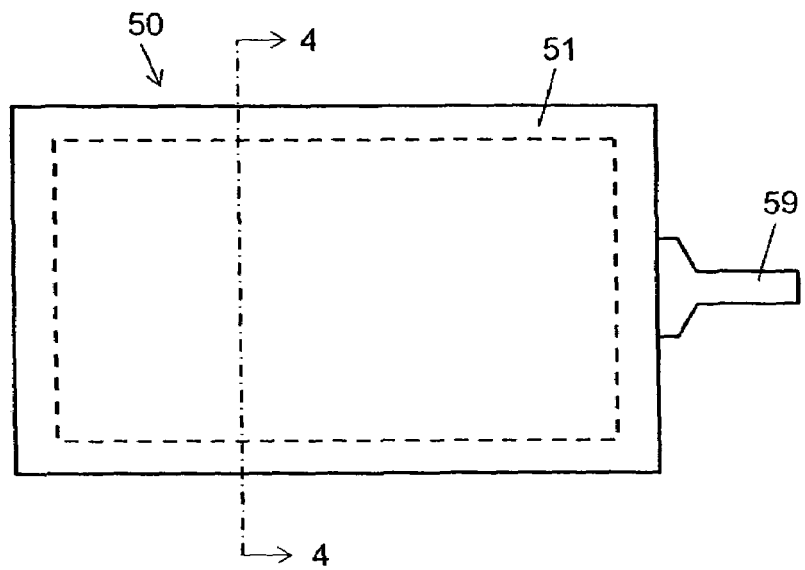
FIG. 3 is a plan view of the conventional touch panel.
Figure 4:
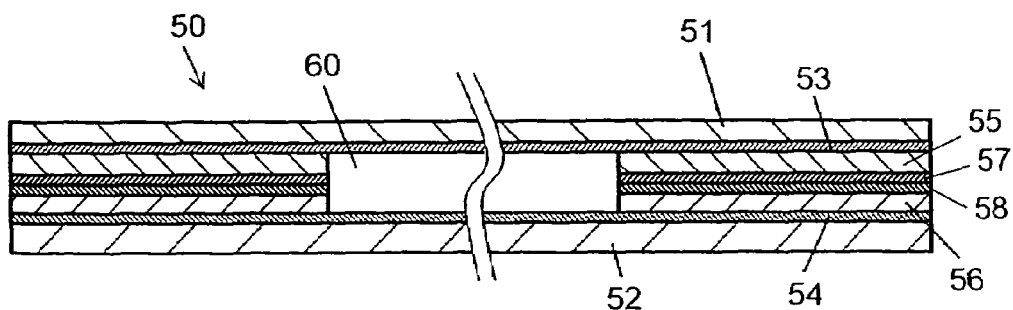
FIG. 4 is a sectional view taken along line 4-4, of the touch panel shown in FIG. 3.

FIG. 1 is a plan view of a touch panel according to an embodiment of the present invention. FIG. 2 is a sectional view taken along line 2-2, of the touch panel shown in FIG. 1. In FIGS. 1 and 2, upper substrate 21 has a film-like shape with a material such as polyethylene terephthalate or polycarbonate and is light-transmissive. Lower substrate 22 is made from a material such as glass, acrylic, or polycarbonate, and is light-transmissive. A lower surface of upper substrate 21 is formed thereon with light-transmissive upper conductive layer 23 with a material such as indium tin oxide or oxidization tin. A top surface of lower substrate 22 is also formed thereon with light-transmissive lower conductive layer 24 with a material such as indium tin oxide or oxidization tin. Upper conductive layer 23 and lower conductive layer 24 are respectively formed with a process of sputtering or the like.

The top surface of lower conductive layer 24 is formed thereon with a plurality of dot-shaped spacers (not illustrated) made from insulating resin such as epoxy or silicon at certain intervals. Both ends of upper conductive layer 23 are formed thereon with a pair of upper electrodes (not illustrated) with a material such as silver or carbon. Both ends of lower conductive layer 24 are formed thereon with a pair of lower electrodes (not illustrated) with a material such as silver or carbon, orthogonally to the upper electrodes.

Upper insulating layer 25 formed on an inner edge of the lower surface of upper substrate 21 has a frame-like shape with a thickness of around 30 μm, using a material such as epoxy or polyester. Lower insulating layer 26 formed on an inner edge of the top surface of lower substrate 22 has a frame-like shape with a thickness of around 50 μm, using a material such as epoxy or polyester. Further, the lower surface of upper insulating layer 25 is formed thereon with frame-like-shaped upper bonding layer 31 with a thickness of around 15 μm, with a material such as acrylic or rubber. In the same way, the top surface of lower insulating layer 26 is formed thereon with frame-like-shaped lower bonding layer 32, with a material such as acrylic or rubber. Here, "frame-like-shaped" refers to an outer frame with a polygonal shape such as quadrangle, shown by outer circumference 35 and the broken line in FIG. 1.

Furthermore, upper bonding layer 31 is formed thereon with first open groove 33 (hereinafter referred to as "groove 33") composing an open groove with a width of around 0.5 mm. And lower bonding layer 32 is formed thereon with second open groove 34 (hereinafter referred to as "groove 34") composing an open groove with a width of around 1 mm. Groove 33 and groove 34 are different in width and provided so as to overlap each other. Further, groove 33 and groove 34 are formed not vertically but obliquely to outer circumference 35 of upper substrate 21 and lower substrate 22.

Wiring board 29 is made from a material such as polyethylene terephthalate or polycarbonate and is film-like. The top and lower surfaces of wiring board 29 are formed thereon with a plurality of wiring patterns (not illustrated) with a material such as silver, carbon, or copper foil. One end of these wiring patterns is connected to an upper electrode, lower one, or other one.

Additionally, upper bonding layer 31 and lower bonding layer 32, both composing bonding layers, join outer parts of upper substrate 21 and lower substrate 22 together. Then, upper conductive layer 23 and lower conductive layer 24 are arranged facing each other with air gap 30 provided, to compose touch panel 20.

Touch panel 20 composed in this way is arranged on a front surface of a liquid crystal display element (not illustrated) or the like, to be attached to an electronic device. Further, a pair of upper electrodes and a pair of lower electrodes are connected to an electronic circuit (not illustrated) of the device through wiring board 29.

In the above-mentioned makeup, the top surface of upper substrate 21 is pressed by a finger, pen, or the like, while the display of the liquid crystal display element or the like on the back surface of touch panel 20 is viewed. Consequently, upper substrate 21 deforms, causing upper conductive layer 23 corresponding to a position having been pressed to contact with lower conductive layer 24.

Then a voltage is applied sequentially to the upper and lower electrodes from the electronic circuit. The electronic circuit detects a position having been pressed owing to the voltage ratio between these electrodes, enabling various functions of the device to be selected.

Grooves 33 and 34 respectively formed on upper bonding layer 31 and lower bonding layer 32 make air gap 30 communicating with air outside touch panel 20. This makeup allows air to flow in and out between air gap 30 and air outside touch panel 20 through grooves 33 and 34. Accordingly, even if touch panel 20 is used at a location in a different environment such as atmospheric pressure and humidity, upper conductive layer 23 and lower conductive layer 24 are resistant to being warped due to expansion and contraction of the air in air gap 30. This provides stable contact, thus allowing touch panel 20 to act stably.

Generally, upper bonding layer 31 and lower bonding layer 32 are formed by applying or printing an adhesive with a material such as acrylic or rubber onto upper insulating layer 25 and lower insulating layer 26. Grooves 33 and 34 are easily formed by applying or printing in a state of a part of the frame shape preliminarily notched when producing upper bonding layer 31 and lower bonding layer 32.

The difference in width of groove 33 and groove 34, even if displacement in positioning occurs when upper substrate 21 is bonded with lower substrate 22, prevents the open grooves of the displaced portion from being blocked by each other's bonding surface. Accordingly, a stable width of the open grooves is always ensured. If grooves 33 and 34 have widths of 0.5 mm and 1 mm, respectively, for example, the open grooves are not blocked by each other's bonding surface, even if the center is displaced to the right or left by up to 0.25 mm.

Grooves 33 and 34 are as thin as around 10 μm to 30 μm thicknesswise, thus preventing large particles such as dust from entering air gap 30 while allowing air to flow in and out through grooves 33 and 34. Meanwhile, if small particles such as dust enter grooves 33 and 34, they are bonded in the bonding layer exposed on the side while passing through grooves 33 and 34, which are formed on the surfaces of bonding layer 31 and 32, respectively, thus being prevented from entering air gap 30.

In addition, grooves 33 and 34 are formed not vertically but obliquely to outer circumference 35 of upper substrate 21 and lower substrate 22. This makeup allows open grooves 33 and 34 to be formed longer than in a case where the grooves are formed vertically to outer circumference 35, thus tending to prevent particles such as dust from entering air gap 30.

In this way, touch panel 20 is composed that has grooves 33 and 34 formed on upper bonding layer 31 and lower bonding layer 32 on the respective inner edges of upper substrate 21 and lower substrate 22. This makeup allows air gap 30 between upper conductive layer 23 and lower conductive layer 24 to communicate with outside air through open grooves 33 and 34. Accordingly, even if touch panel 20 is used at a location in a different environment such as atmospheric pressure and humidity, upper conductive layer 23 and lower conductive layer 24 are resistant to being warped due to expansion and contraction of the air in air gap 30, providing stable contact. Consequently, touch panel 20 is available that tends to prevent particles such as dust from entering air gap 30 and is reliably operable with a simple makeup.

Here, the above description is made for the makeup in which upper bonding layer 31 and lower bonding layer 32 are respectively provided on upper insulating layer 25 and on lower insulating layer 26, formed on the inner edges of upper substrate 21 and lower substrate 22. However, one of upper bonding layer 31 and lower bonding layer 32 may be formed and join upper substrate 21 and lower substrate 22 together.

Alternatively, a frame-like-shaped sheet (not illustrated) with an adhesive applied on its top and lower surfaces may join upper substrate 21 and lower substrate 22 together. Furthermore, upper substrate 21 may be joined with lower substrate 22 without using upper insulating layer 25 and/or lower insulating layer 26. As mentioned above, the present invention can be implemented with various types of makeup of touch panel 20.

Still, the description is made for the makeup in which open grooves 33 and 34 are provided on both upper bonding layer 31 and lower bonding layer 32. However, only one of grooves 33 and 34 may be provided.

The description is made for grooves 33 and 34 that are straight-line shaped. However, they may be S-shaped, crank-shape, or the like. These shapes allow open grooves 33 and 34 to be formed long within the small area, thus preventing particles such as dust from entering air gap 30 further efficiently.

What is claimed is:

1. A touch panel comprising:
    a light-transmissive upper substrate formed with an upper conductive layer on a lower surface of the upper substrate;
    a light-transmissive lower substrate formed with a lower conductive layer facing the upper conductive layer with an air gap, on a top surface of the lower substrate; and
    a bonding layer formed on at least one of inner edges of a lower surface of the upper substrate and a top surface of the lower substrate, and has a first open groove overlapping a second open groove, both the first and the second open grooves communicating with the air gap.

2. The touch panel as claimed in claim 1,
   wherein the bonding layer includes:
       an upper bonding layer that is formed on a lower surface of the upper substrate and has the first open groove; and
       a lower bonding layer that is formed on a top surface of the lower substrate and has the second open groove,
   wherein the first open groove and the second open groove have widths different from each other.

3. The touch panel as claimed in claim 1,
   wherein the first and second open grooves are formed obliquely to an outer circumference of the upper and the lower substrates.

4. The touch panel as claimed in claim 1,
   wherein the upper substrate includes an upper insulating layer formed on a lower surface of the upper substrate, and
   wherein the bonding layer is formed on a lower surface of the upper insulating layer.

5. The touch panel as claimed in claim 1,
   wherein the lower substrate includes a lower insulating layer formed on a top surface of the lower substrate, and
   wherein the bonding layer is formed on a top surface of the lower insulating layer.

* * * * *